US012348012B2

(12) United States Patent
Lin et al.

(10) Patent No.: US 12,348,012 B2
(45) Date of Patent: Jul. 1, 2025

(54) INTEGRATED SUBSTATION

(71) Applicant: Fortune Electric Co., Ltd., Taoyuan (TW)

(72) Inventors: Chia-Ching Lin, Taoyuan (TW); Chao-Chung Liu, Taoyuan (TW); Chia-Tai Hsu, Taoyuan (TW)

(73) Assignee: Fortune Electric Co., Ltd., Taoyuan (TW)

( * ) Notice: Subject to any disclaimer, the term of this patent is extended or adjusted under 35 U.S.C. 154(b) by 432 days.

(21) Appl. No.: 17/989,625

(22) Filed: Nov. 17, 2022

(65) Prior Publication Data

US 2024/0170930 A1 May 23, 2024

(51) Int. Cl.
*H02B 7/00* (2006.01)
*H02B 1/30* (2006.01)
*H02B 1/56* (2006.01)

(52) U.S. Cl.
CPC .............. *H02B 7/00* (2013.01); *H02B 1/30* (2013.01); *H02B 1/565* (2013.01)

(58) Field of Classification Search
CPC . H02B 7/00; H02B 1/565; H02B 1/56; H02B 7/06
See application file for complete search history.

(56) References Cited

U.S. PATENT DOCUMENTS

| | | | | |
|---|---|---|---|---|
| 2,359,174 A | * | 9/1944 | Vogel | H01F 27/08 165/104.31 |
| 4,266,602 A | * | 5/1981 | White | H01F 27/33 165/DIG. 313 |
| 8,461,953 B1 | * | 6/2013 | Ward | F28F 27/00 336/62 |
| 2011/0043999 A1 | * | 2/2011 | Johnston | H01F 27/40 361/699 |
| 2016/0118186 A1 | * | 4/2016 | Frimpong | F41J 5/056 307/119 |
| 2019/0027292 A1 | * | 1/2019 | Findeisen | H01F 27/12 |
| 2023/0378726 A1 | * | 11/2023 | Sheng | H02B 1/565 |

* cited by examiner

*Primary Examiner* — Adam B Dravininkas
(74) *Attorney, Agent, or Firm* — Li & Cai Intellectual Property Office (57) ABSTRACT

An integrated substation is provided. The integrated substation includes a cabinet and at least one airflow driver. The cabinet has a high pressure room, a low pressure room, and an exchange room located between the high pressure room and the low pressure room. The exchange room and the high pressure room are separated from each other by a first inner wall, and the exchange room and the low pressure room are separated from each other by a second inner wall.

11 Claims, 11 Drawing Sheets

INTEGRATED SUBSTATION

FIELD OF THE DISCLOSURE

The present invention relates to a power distribution facility, and more particularly to an integrated substation that includes a high pressure room, a low pressure room, and an exchange room that are adjacent and separate from each other.

BACKGROUND OF THE DISCLOSURE

A substation is an indispensable part of a power system. The substation can convert high-voltage electricity into low-voltage electricity and distribute the low-voltage electricity to users, or convert low-voltage electricity into high-voltage electricity and then integrate the high-voltage electricity into the power grid. Since the substation is usually installed outdoors, components of the substation, such as transformers, high and low-voltage devices, need to be installed in a cabinet, so that external environmental factors do not negatively influence the substation.

However, waterproof and dustproof capabilities still need to be considered for conventional cabinets adopting a natural ventilation design, such as a cabinet that has one or more ventilation and heat dissipation windows formed thereon, and a space (i.e., a floor space) occupied by the cabinet needs to be reduced, which can often lead to difficulties in heat dissipation. On the other hand, conventional cabinets adopting a forced ventilation design use multiple internal fans that occupy a large portion of internal space, such that optimizing the design of the internal space of the cabinet becomes difficult. Moreover, the abovementioned forced ventilation design may also require the cooperation of certain special structures to divert an airflow direction, and such special structures are prone to generate airflow resistance and lead to heat accumulation.

Therefore, how to solve the problems of heat dissipation of the devices in a limited space through improvements in structural design has become an important issue to be addressed in the relevant field.

SUMMARY OF THE DISCLOSURE

In response to the above-referenced technical inadequacies, the present disclosure provides an integrated substation having good heat dissipation and cooling effects.

In one aspect, the present disclosure provides an integrated substation. The integrated substation includes a cabinet, a power transformer, a high-voltage device, a low-voltage device, and at least one airflow driver. The cabinet has a high pressure room, a low pressure room, and an exchange room located between the high pressure room and the low pressure room. The exchange room and the high pressure room are separated from each other by a first inner wall, and the exchange room and the low pressure room are separated from each other by a second inner wall. The power transformer is arranged in the exchange room. The high-voltage device is disposed in the high pressure room and is electrically connected to the power transformer. The low-voltage device is disposed in the low pressure room and is electrically connected to the power transformer. The at least one airflow driver is disposed on the second inner wall. The low pressure room is configured to introduce outside air, the at least one airflow driver is configured to generate a forced airflow from the low pressure room to the exchange room, and the exchange room is configured to exchange heat between indoor air and outside air.

In certain embodiments, the exchange room includes an oil collecting tank located under the power transformer.

In certain embodiments, the oil collecting tank is formed by being surroundingly defined by a plurality of oil baffles.

In certain embodiments, the cabinet includes a ventilation door structure, the ventilation door structure corresponds in position to the exchange room, and the ventilation door structure is configured to close or open the exchange room.

In certain embodiments, the ventilation door structure includes a left ventilation door, a right ventilation door, and a support member, the left ventilation door and the right ventilation door are arranged opposite to the left and right sides of the support member, and when the left ventilation door and the right ventilation door are moved to a closed position, the left ventilation door and the right ventilation door are connected in an interference fit with the support member.

In certain embodiments, the cabinet includes at least one air intake member and the at least one air intake member corresponds in position to the low pressure room and is in fluid communication with the low pressure room.

In certain embodiments, the integrated substation further includes a shielding structure disposed on a top cover of the cabinet.

In certain embodiments, the shielding structure is a solar panel or a sunshade.

In certain embodiments, the first inner wall and the second inner wall are each an insulating wall.

In certain embodiments, the insulating wall includes two partitions and a thermal insulating material distributed between the two partitions.

In certain embodiments, the bottom frame of the cabinet includes a plurality of reinforcing ribs and a plurality of hollow portions located between the plurality of reinforcing ribs.

In conclusion, by virtue of "the cabinet having a high pressure room, a low pressure room, and an exchange room located between the high pressure room and the low pressure room, the exchange room and the high pressure room being separated from each other by the first inner wall, and the exchange room and the low pressure room being separated from each other by a second inner wall," the power transformer and the high-voltage and low-voltage devices can be well integrated for comprehensive integrated configuration and centralized management. Therefore, the integrated substation of the present disclosure has the beneficial effects of having a simple and compact structure, being conveniently installed and maintained, and having high operational reliability. In addition, by virtue of "the low pressure room being configured to introduce outside air, the airflow driver being disposed on the second inner wall and being configured to generate the forced airflow from the low pressure room to the exchange room, and the exchange room being configured to exchange heat between indoor air and outside air," the heat accumulation inside the cabinet can be significantly improved to achieve good heat dissipation and cooling effects and ensure the stable operation of the integrated substation. These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4 and FIG. 6, a first embodiment of the present disclosure provides an integrated substation Z that can be used for voltage modulation in a power transmission system, such as stepping down high-voltage electricity to low-voltage electricity. The integrated substation Z includes a cabinet 1, a power transformer 2, a high-voltage device 3, a low-voltage device 4, and at least one airflow driver 5. The power transformer 2, the high-voltage device 3, the low-voltage device 4, and the at least one airflow driver 5 are skillfully arranged into the cabinet 1, so that they are not easily affected by external environmental factors.

In this embodiment, the cabinet 1 has a high pressure room 101, a low pressure room 102, and an exchange room 103 located between the high pressure room 101 and the low pressure room 102. The exchange room 103 and the high pressure room 101 are separated from each other by a first inner wall 11, and the exchange room 103 and the low pressure room 102 are separated from each other by a second inner wall 12. The power transformer 2 is arranged in the exchange room 103, the high-voltage device 3 is disposed in the high pressure room 101, the low-voltage device 4 is disposed in the low pressure room 102, and the at least one airflow driver 5 is disposed on the second inner wall 12. In addition, the first inner wall 11 has a first opening 110 located near a bottom edge of the first inner wall 11 to facilitate the electrical connection between the power transformer 2 and the high-voltage device 3, and the second inner wall 12 has a second opening 120 located near a top edge of the second inner wall 12 to facilitate the electrical connection between the power transformer 2 and the low-voltage device 4.

In practice, the high-voltage device 3 and the low-voltage device 4 can include a power distribution device and a switch device, and the power transformer 2 can be an oil-immersed transformer. A high-voltage side of the power transformer 2 can be electrically connected to the high-voltage device 3 through copper bars and/or cables, and a low-voltage side of the power transformer 2 can be electrically connected to the low-voltage device 4 through copper bars and/or cables.

Figure 3:
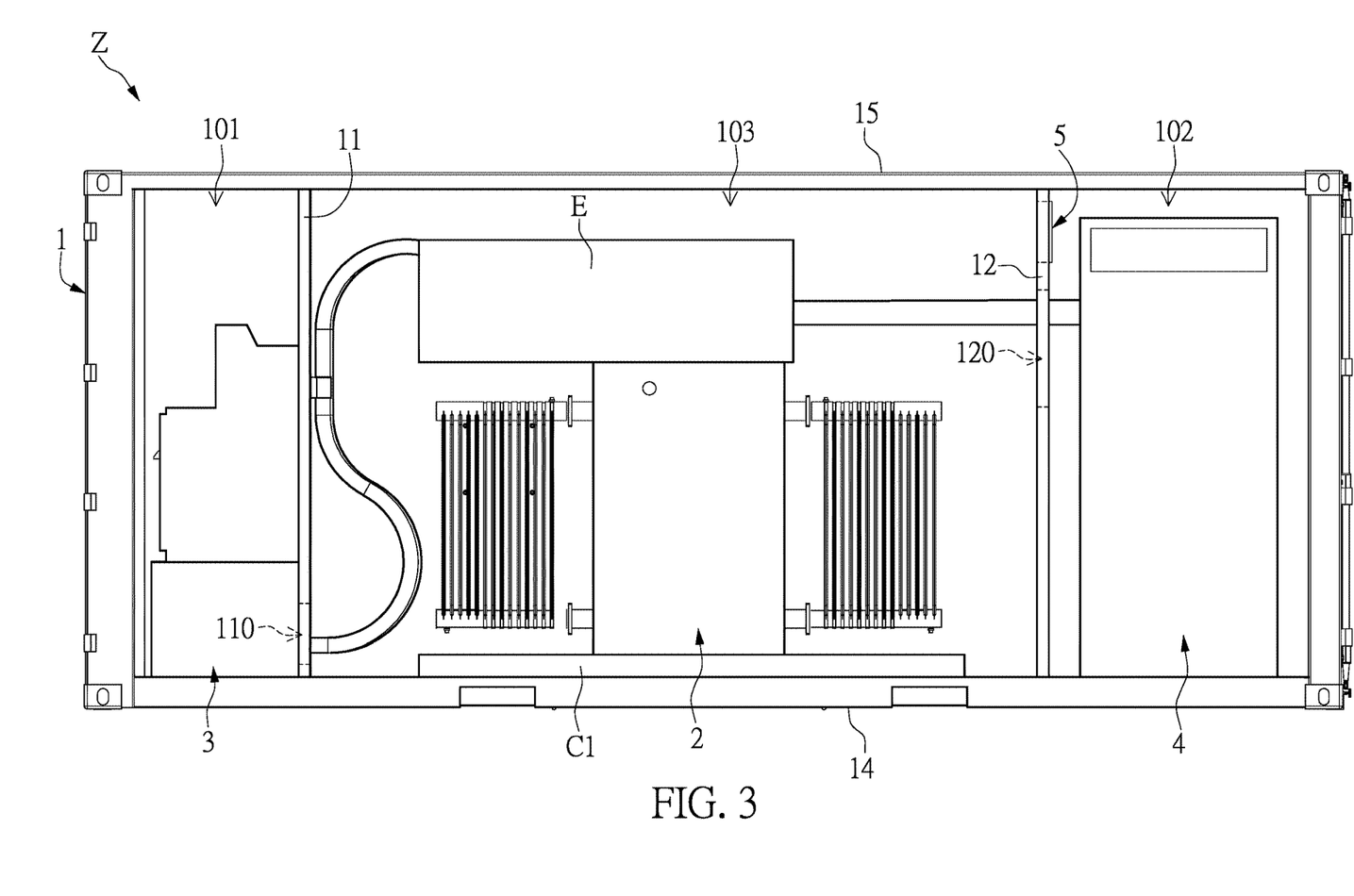
FIG. 3 is a partial schematic planar view of the integrated substation according to the first embodiment of the present disclosure.
Figure 4:
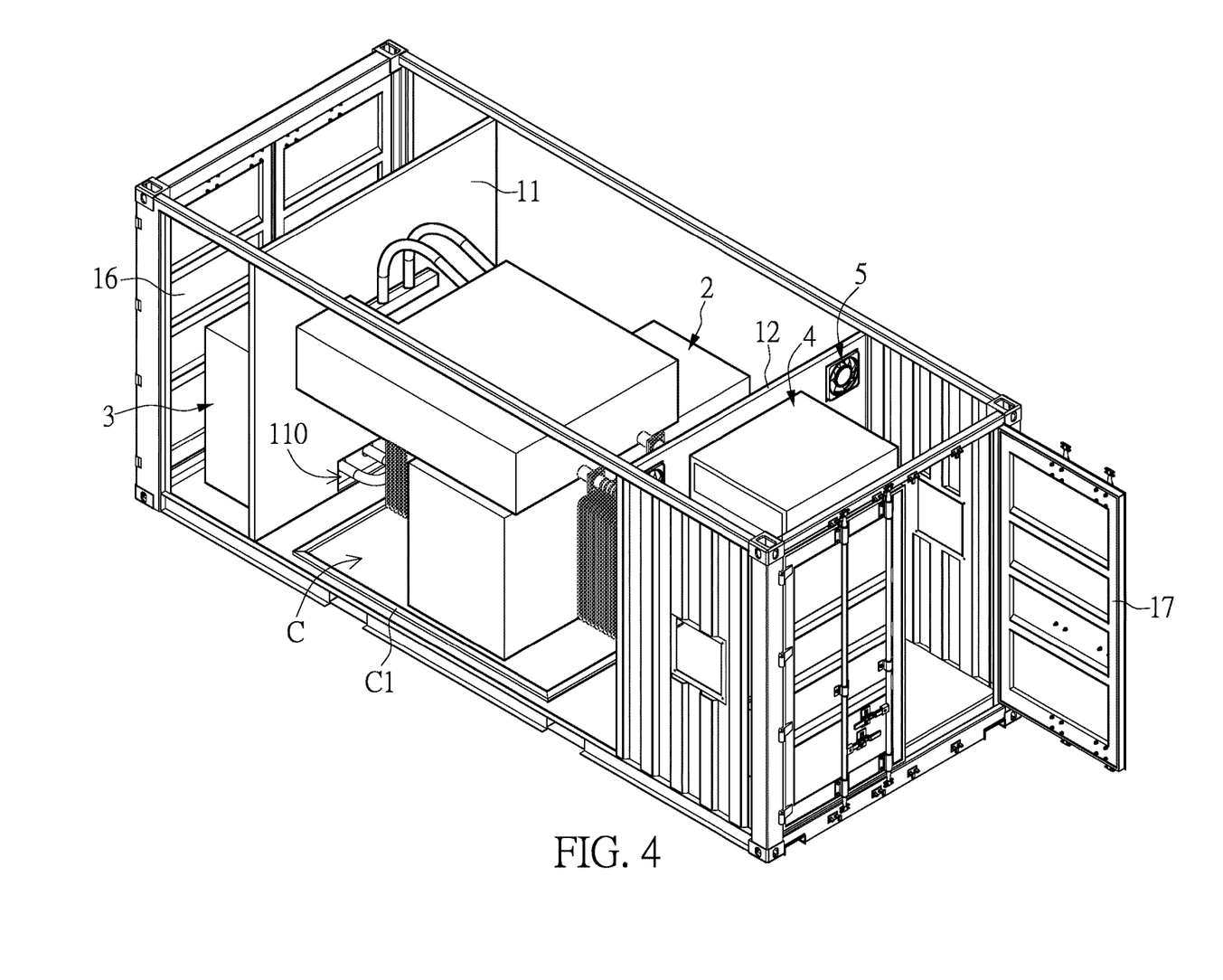
FIG. 4 is a partial schematic perspective view of the integrated substation according to the first embodiment of the present disclosure.

In addition, an oil collecting tank C can be provided below the power transformer 2, so that the insulating oil leaked from the power transformer 2 can be collected for easy removal, and the oil collecting tank C can be formed by being surroundingly defined by a plurality of oil baffles C 1. An insulating envelope E can be provided above the power transformer 2 to encapsulate the connection between the copper bars and/or cables and the power transformer 2. Furthermore, the airflow driver 5 can be a fan. However, the aforementioned details are disclosed for exemplary purposes only, and are not meant to limit the scope of the present disclosure.

Figure 6:
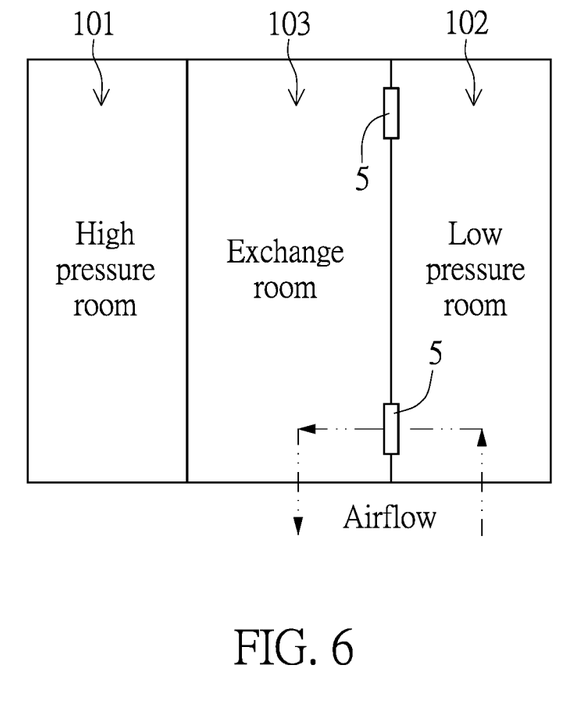
FIG. 6 is a plan view showing a high pressure room, a low pressure room, an exchange room and an airflow driver of the integrated substation according to the first embodiment of the present disclosure.

After analysis, it can be known that in order to ensure stable operation of the substation under severe conditions, the heat emitted by the power transformer 2 needs to be discharged outside through the exchange room 103, and the low pressure room 102 should not have excessive heat accumulation. In this regard, the integrated substation Z of the present disclosure adopts a mixed ventilation design based on natural ventilation and forced ventilation. The low pressure room 102 can be configured to introduce outside air, and the at least one airflow driver 5 can be configured to generate a forced airflow from the low pressure room 102 to the exchange room 103. Further, the exchange room 103 can be configured to promote heat exchange (convective exchange) between indoor air and outside air. Therefore, the integrated substation Z can effectively reduce the heat accumulated in the cabinet 1, specifically the heat accumulated in the low pressure room 102, such as the heat emitted by machines, equipment, copper bars, or cables, such that the service life of the power transformer 2, the high-voltage device 3, and the low-voltage device 4 can be prolonged, and the operation stability of the power transformer 2, the high-voltage device 3, and the low-voltage device 4 can be improved.

In a preferred embodiment, a quantity of the airflow driver 5 is two, and the two airflow drivers are respectively disposed on left and right sides of the second opening 120, so that the forced airflow that is generated can easily bring the heat accumulated in the low pressure room 102 to the exchange room 103 and quickly dissipate the heat to the external environment. In addition, the airflow driver 5 has an intelligent control function, that is, the operating frequency of the airflow driver 5 can be directly adjusted according to the change of a temperature of the low pressure room 102, so that the low-voltage device 4 can work under an allowable temperature.

Figure 1:
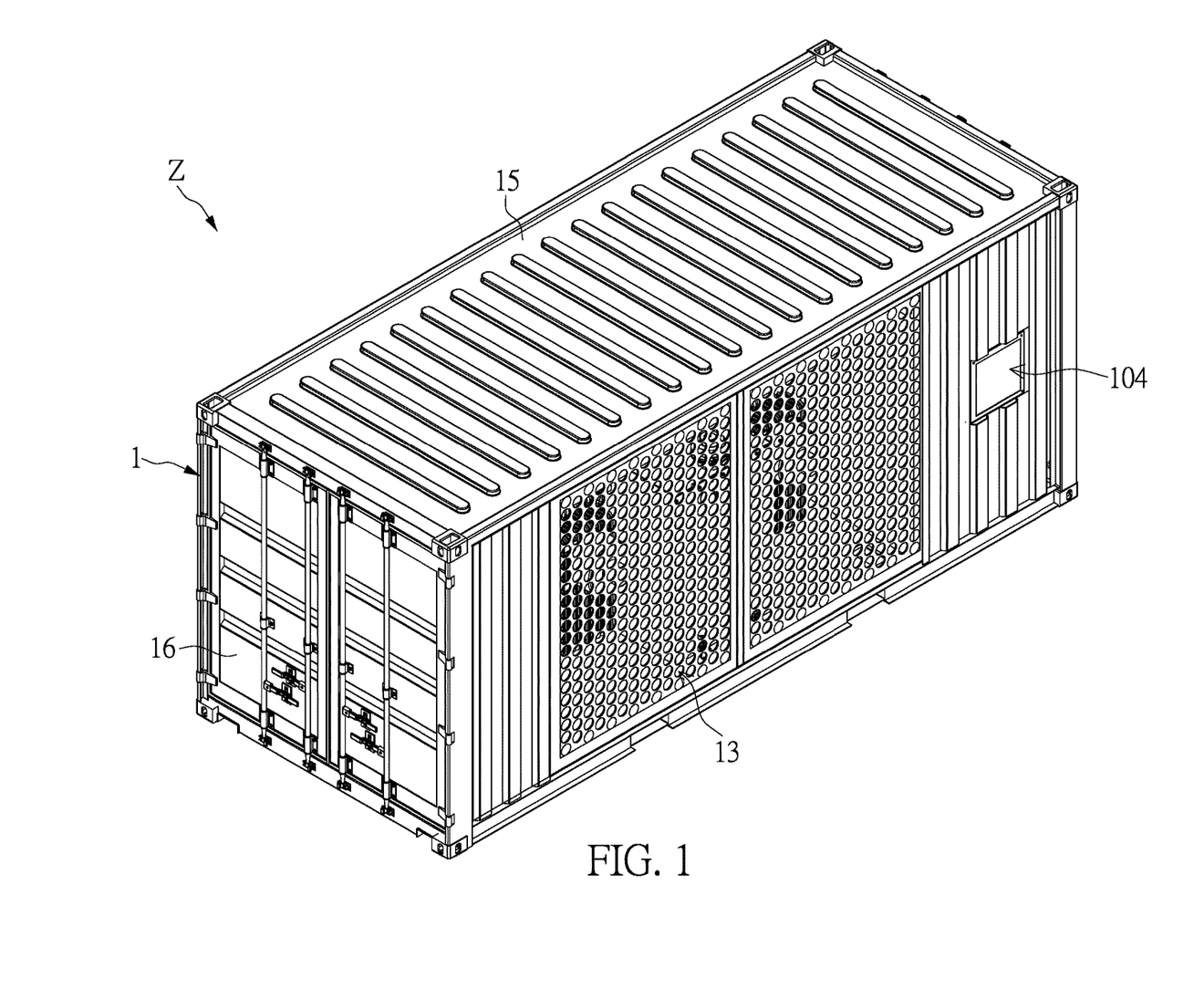
FIG. 1 is a schematic perspective view of an integrated substation according to a first embodiment of the present disclosure.
Figure 2:
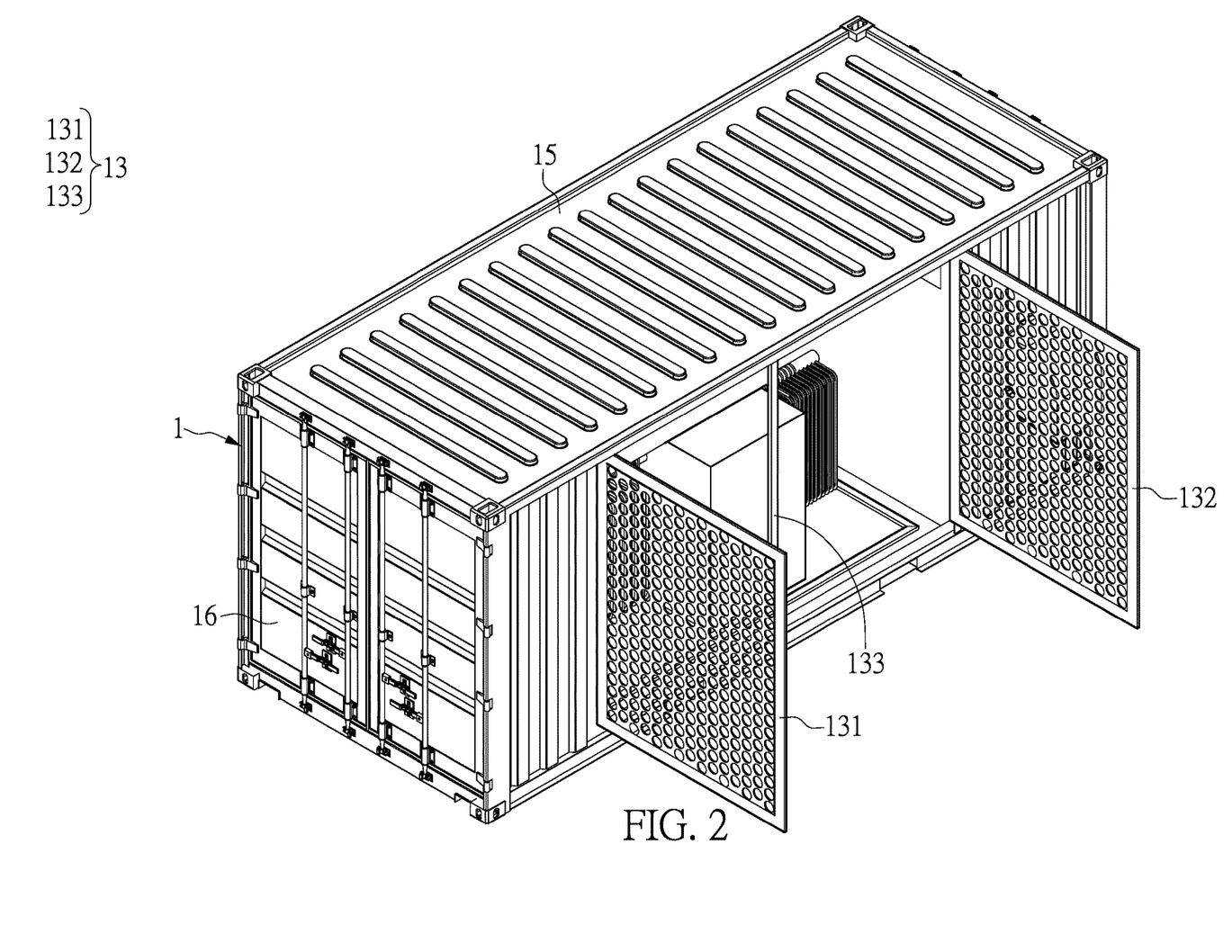
FIG. 2 is another schematic perspective view of the integrated substation according to the first embodiment of the present disclosure.

Further, the cabinet 1 can be an aluminum alloy cabinet, a steel cabinet, or a fiber-reinforced plastic cabinet, but the present disclosure is not limited thereto. The cabinet 1 includes a ventilation door structure 13 and at least one air inlet 104. The ventilation door structure 13 corresponds in position to the exchange room 103, and the ventilation door structure 13 can be configured to close or open the exchange room 103. Accordingly, the power transformer 2 can be moved in or out of the exchange room 103 through the ventilation door structure 13, and the air in the exchange room 103 can be exchanged with outside air through the ventilation door structure 13. The air inlet 104 corresponds in position to the low pressure room 102, and the air inlet 104 is in fluid communication with the low pressure room 102. Accordingly, outside air can be drawn into the low pressure room 102 through the air inlet 104 under the effect of the negative pressure generated by the airflow driver 5. Preferably, a quantity of the air inlet 104 is two, and the low pressure room 102 is communicated between the two air inlets 104.

Referring to FIG. 1 and FIG. 2, the ventilation door structure 13 includes a left ventilation door 131, a right ventilation door 132, and a supporting member 133, and the left ventilation door 131 and the right ventilation door 132 are arranged opposite to the left and right sides of the supporting member 133. The left ventilation door 131 and the right ventilation door 132 can be configured to have a same size or different sizes. In practical applications, the left ventilation door 131 or the right ventilation door 132 has a plurality of ventilation holes (not labeled in the figures), and one side edge of the left ventilation door 131 or the right ventilation door 132 is pivotally connected to a side wall of the cabinet 1, so that the left ventilation door 131 or the right ventilation door 132 can be flipped open (i.e., being moved to an open position) to open the exchange room 103, or can be flipped closed (i.e., being moved to a closed position) to close the exchange room 103. Further, the left ventilation door 131 or the right ventilation door 132 can be connected in an interference fit (i.e., a bolted connection) with the supporting member 133 when the left ventilation door 131 or the right ventilation door 132 are moved to the closed position to continuously remain in the closed position. Furthermore, the supporting member 133 is connected between a bottom frame 14 and a top cover 15 of the cabinet 1 to improve the structural strength of the cabinet 1. The supporting member 133 can be a supporting column, but is not limited thereto.

Referring to FIG. 4, the cabinet 1 further includes a first cabinet door 16 and a second cabinet door 17. The first cabinet door 16 corresponds in position to the high pressure room 101, and the first cabinet door 16 is configured to close or open the high pressure room 101. The second cabinet door 17 corresponds in position to the low pressure room 102, and the second cabinet door 17 is configured to close or open the low pressure room 102. The first cabinet door 16 and the second cabinet door 17 can be single-opening cabinet doors or double-opening cabinet doors, and are preferably double-opening cabinet doors. Accordingly, the high-voltage device 3 can be moved in or out of the high pressure room 101 through the first cabinet door 16, and the low-voltage device 4 can be moved in or out of the low pressure room 102 through the second cabinet door 17. Moreover, relevant technicians only need to turn the first cabinet door 16 or the second cabinet door 17 outwards to an open position so as to perform works such as maintenance, repair, and tests on the high-voltage device 3 or the low-voltage device 4.

According to practical implementations, the cabinet 1 can further include another ventilation door structure (not shown in the figures), and the exchange room 103 is located between the ventilation door structure 13 and the another ventilation door structure and is in fluid communication with the ventilation door structure 13 and the another ventilation door structure. In some embodiments, the another ventilation door structure can be replaced by at least one ventilation and heat dissipation window.

Figure 5:
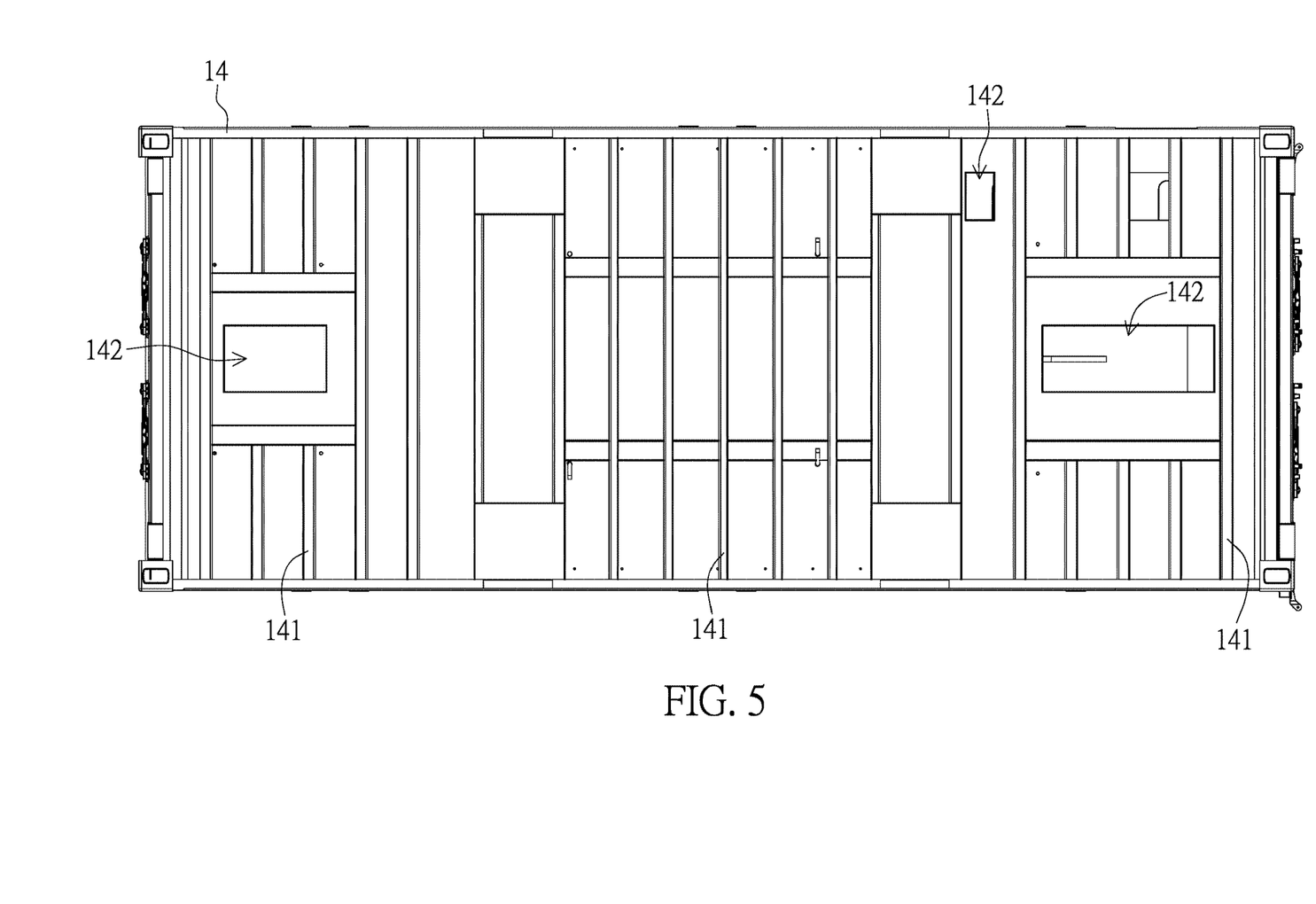
FIG. 5 is a schematic bottom view of the integrated substation according to the first embodiment of the present disclosure.

Referring to FIG. 5, the bottom frame 14 of the cabinet 1 can include a plurality of reinforcing ribs 141 and a plurality of hollow portions 142 located between the plurality of reinforcing ribs 141. The plurality of reinforcing ribs 141 can be used to improve the structural strength of the bottom frame 14, and the plurality of hollow portions 142 can be provided for the wiring of machines or apparatuses to pass therethrough, so as to improve the convenience and flexibility of use.

Figure 7:
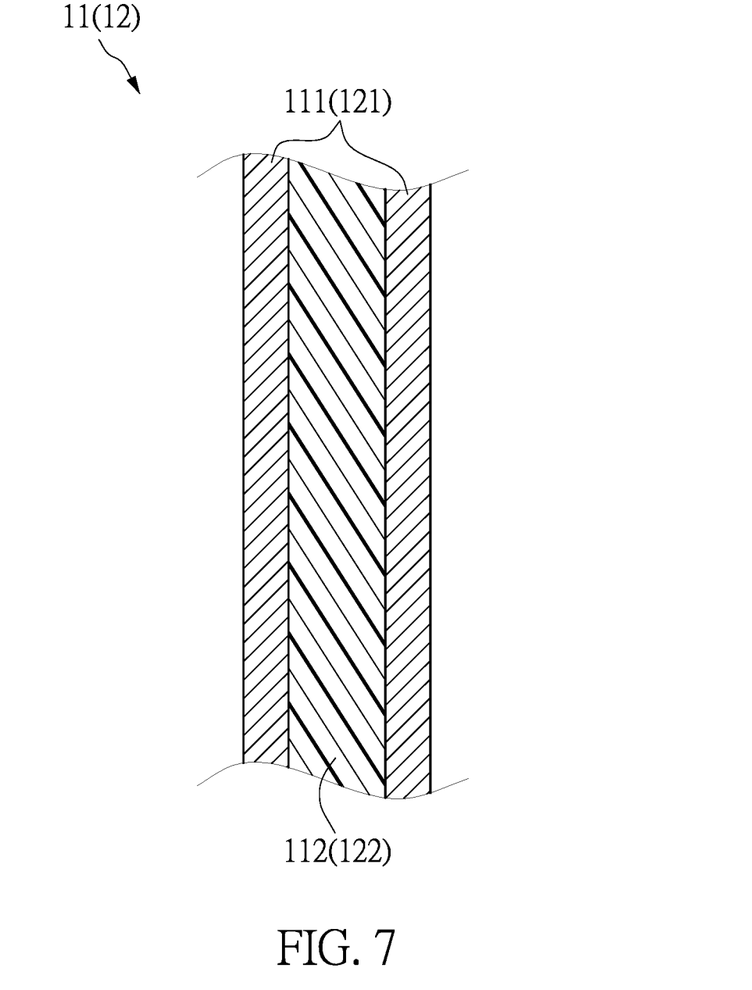
FIG. 7 is a schematic view showing a structure of a first inner wall and a second inner wall of a cabinet of the integrated substation according to the first embodiment of the present disclosure.

Referring to FIG. 7, the first inner wall 11 and the second inner wall 12 of the cabinet 1 can each be an insulating wall, so as to prevent the heat accumulated in the high pressure room 101, the low pressure room 102, or the exchange room 103 from diffusing to adjacent rooms and affecting the normal operation of the machines or apparatuses inside. Further, the first inner wall 11 can include two partitions 111 and a thermal insulating material 112 distributed between the two partitions 111, and the second inner wall 12 can include two partitions 121 and a thermal insulating material 122 distributed between the two partitions 121. The partitions 111 and 121 can be made of galvanized sheet, and the thermal insulating material 112 and 122 can be made of heat-insulating cotton, but the present disclosure is not limited thereto.

Second Embodiment

Figure 8:
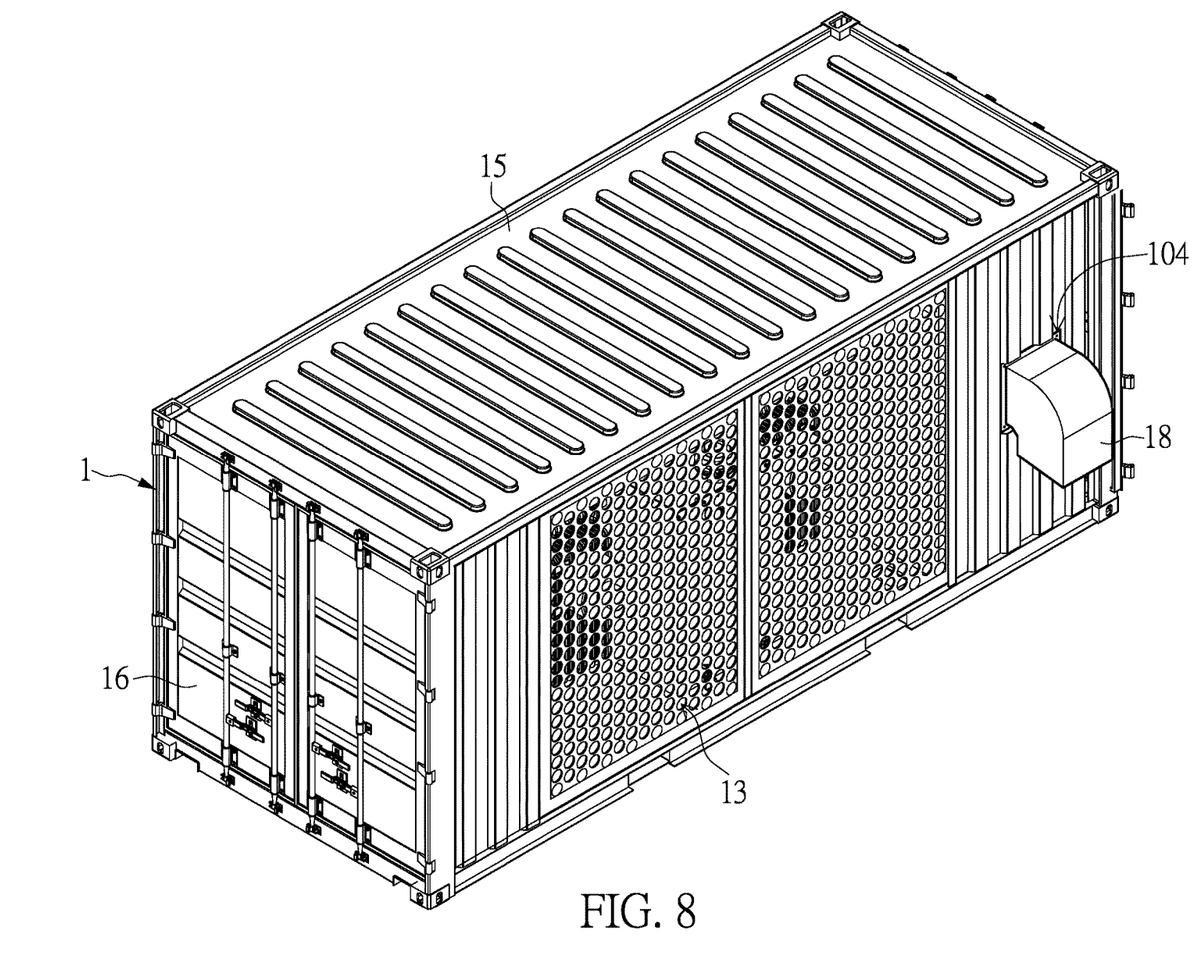
FIG. 8 is a schematic perspective view of an integrated substation according to a second embodiment of the present disclosure.

Referring to FIG. 8, which is to be read in conjunction with FIG. 3 and FIG. 6, a second embodiment of the present disclosure provides an integrated substation Z that includes a cabinet 1, a power transformer 2, a high-voltage device 3, a low-voltage device 4, and at least one airflow driver 5. The cabinet 1 has a high pressure room 101, a low pressure room 102, and an exchange room 103 located between the high pressure room 101 and the low pressure room 102. The exchange room 103 and the high pressure room 101 are separated from each other by a first inner wall 11, and the exchange room 103 and the low pressure room 102 are separated from each other by a second inner wall 12. The power transformer 2 is arranged in the exchange room 103, the high-voltage device 3 is disposed in the high pressure room 101 and is electrically connected to the power transformer 2, the low-voltage device 4 is disposed in the low pressure room 102 and is electrically connected to the power transformer 2, and the at least one airflow driver 5 is disposed on the second inner wall 12. In practice, the low pressure room 102 can be configured to introduce outside air, the at least one airflow driver 5 can be configured to generate a forced airflow from the low pressure room 102 to the exchange room 103, and the exchange room 103 can be configured to promote heat exchange between indoor air and outside air. Therefore, the integrated substation Z can effectively reduce the heat accumulated in the cabinet 1, specifically the heat accumulated in the low pressure room 102, such that the service life of the power transformer 2, the high-voltage device 3, and the low-voltage device 4 can be prolonged and the operation stability of the power transformer 2, the high-voltage device 3, and the low-voltage device 4 can be improved.

The difference between this embodiment and the first embodiment is that, the cabinet 1 includes at least one air intake member 18 that is combined with at least one air inlet 104 leading to the low pressure room 102, so that outside air is more easily drawn into the low pressure room 102 under the effect of the negative pressure generated by the airflow driver 5. In this embodiment, a quantity of the air intake member 18 corresponds to the quantity of the air inlet 104. The air intake member 18 can be a gas hood or an air intake pipe, and according to practical implementations, a flow guide element (not shown in the figures) can be provided inside the air intake member 18. However, the aforementioned details are disclosed for exemplary purposes only, and are not meant to limit the scope of the present disclosure.

The relevant technical details described in the first embodiment are still valid in this embodiment, and are not repeated herein to avoid repetition. Similarly, the relevant technical details mentioned in this embodiment can also be applied in the first embodiment.

Third Embodiment

Figure 9:
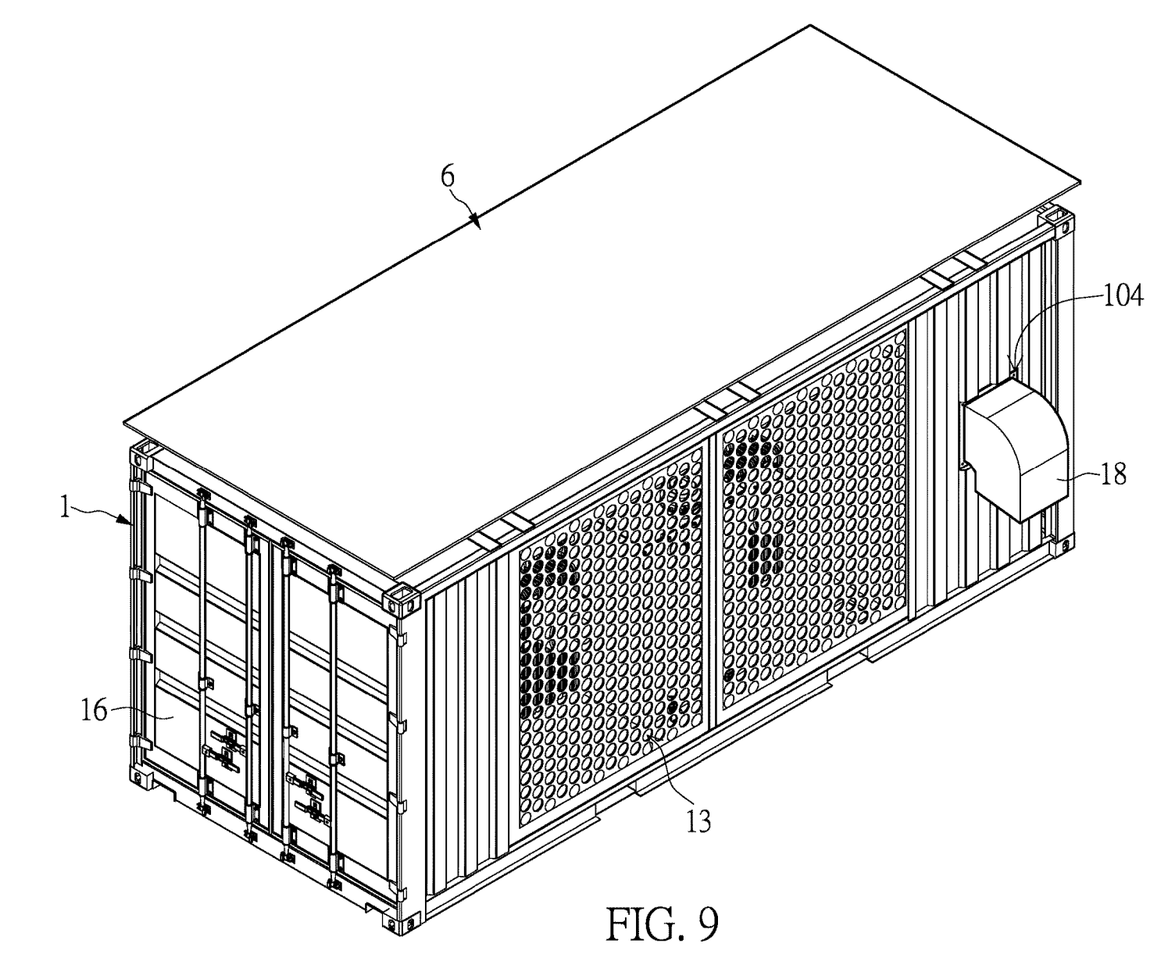
FIG. 9 is a schematic perspective view of an integrated substation according to a third embodiment of the present disclosure.
Figure 10:
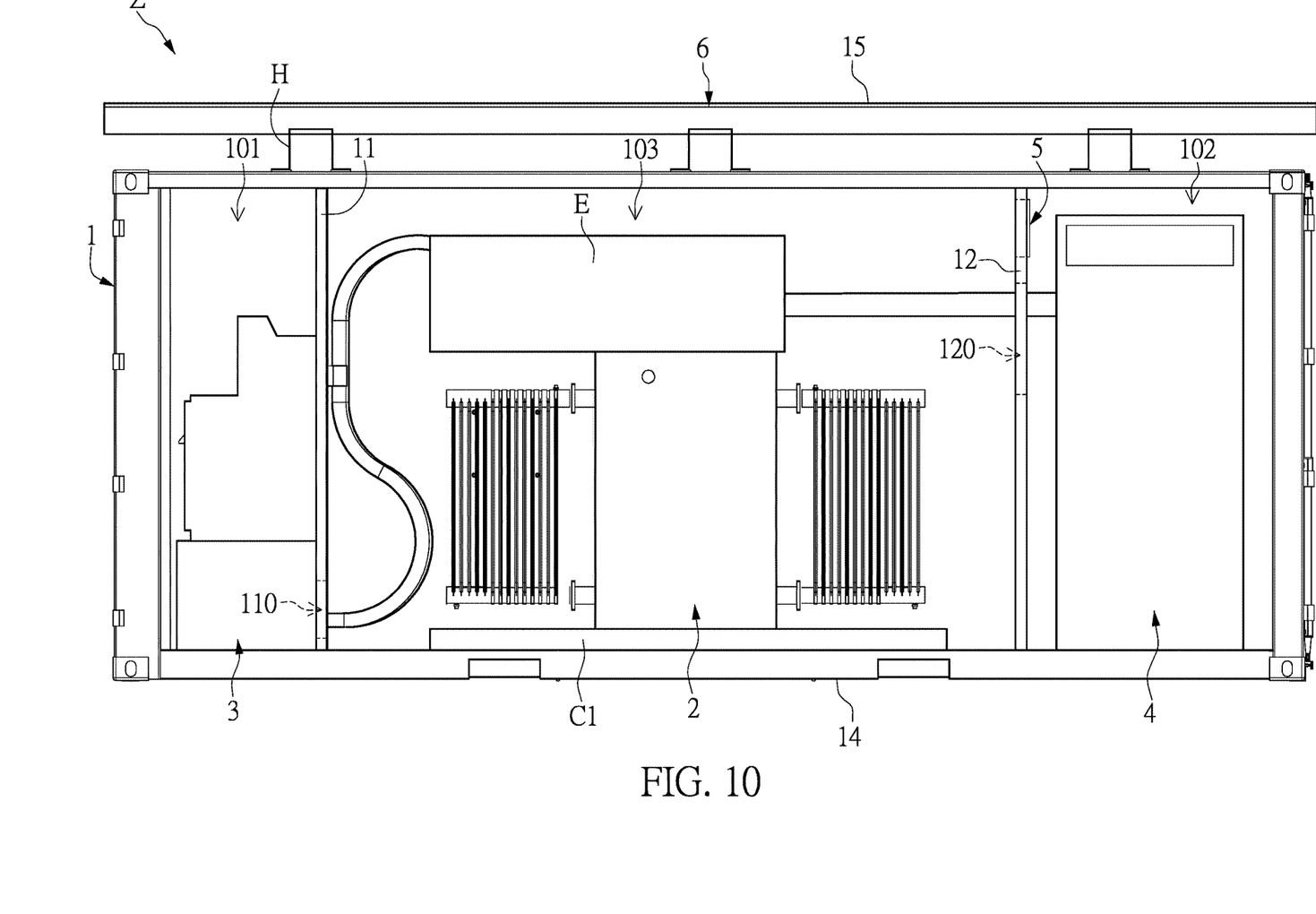
FIG. 10 is a partial schematic planar view of the integrated substation according to the third embodiment of the present disclosure.
Figure 11:
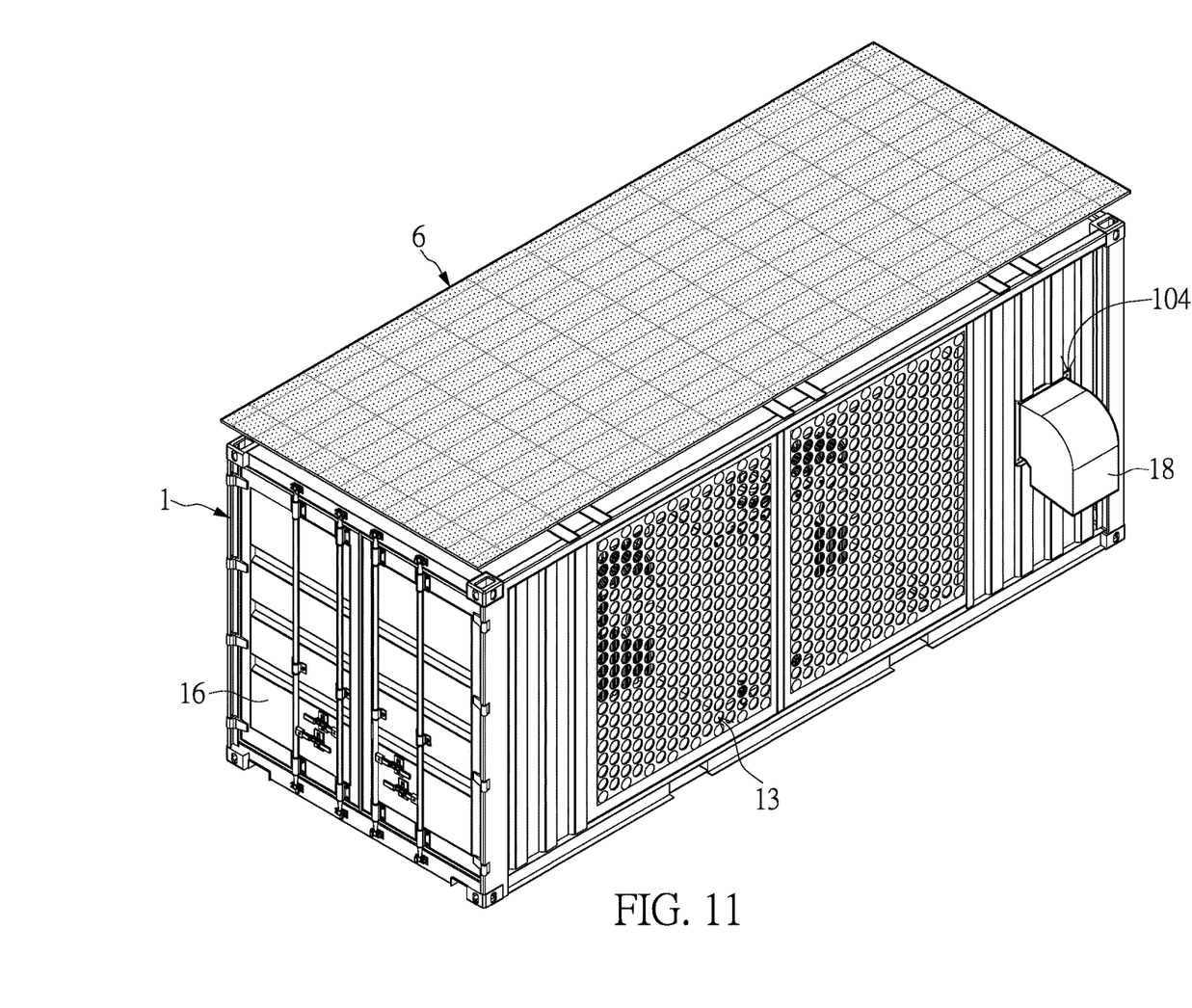
FIG. 11 is another schematic perspective view of the integrated substation according to the third embodiment of the present disclosure.

Referring to FIG. 9 to FIG. 11, in addition to the cabinet 1, the power transformer 2, the high-voltage device 3, the low-voltage device 4, and the airflow driver 5 described in the above embodiments, an integrated substation Z provided in a third embodiment of the present disclosure further includes a shielding structure 6 for blocking solar radiation, thereby improving the heating phenomenon inside the cabinet 1 caused by solar radiation. Regarding the technical details of the cabinet 1, the power transformer 2, the high-voltage device 3, the low-voltage device 4, and the airflow driver 5, reference can be made to the abovementioned embodiments, and will not be reiterated herein.

In this embodiment, the shielding structure 6 is disposed on the top cover 15 of the cabinet 1, and the high pressure room 101, the low pressure room 102, and the exchange room 103 are all located within the shielding range (i.e., an area of coverage) of the shielding structure 6. In practice, the shielding structure 6 can be a solar panel, as shown in FIG. 11, or a sunshade, as shown in FIG. 9 and FIG. 10. The shielding structure 6 is fixedly integrated with the top cover 15 of the cabinet 1 through a plurality of brackets H, and the plurality of brackets H are arranged on the top cover 15 at intervals along a length direction of the top cover 15. According to practical implementations, the shielding structure 6 can be inclined relative to the top cover 15. However, the aforementioned details are disclosed for exemplary purposes only, and are not meant to limit the scope of the present disclosure. It is worth mentioning that, the solar panel as the shielding structure 6 can block solar radiation to achieve better heat dissipation and cooling effect, and can also recover solar energy to generate electricity.

The relevant technical details described in the abovementioned embodiments are still valid in this embodiment, and are not repeated herein to avoid repetition. Similarly, the relevant technical details mentioned in this embodiment can also be applied in the abovementioned embodiments.

Beneficial Effects of the Embodiments

In conclusion, by virtue of "the cabinet having a high pressure room, a low pressure room, and an exchange room located between the high pressure room and the low pressure room, the exchange room and the high pressure room being separated from each other by the first inner wall, and the exchange room and the low pressure room being separated from each other by a second inner wall," the power transformer and the high-voltage and low-voltage devices can be well integrated for comprehensive integrated configuration and centralized management. Therefore, the integrated substation of the present disclosure has the beneficial effects of having a simple and compact structure, being conveniently installed and maintained, and having high operational reliability. In addition, by virtue of "the low pressure room being configured to introduce outside air, the airflow driver being disposed on the second inner wall and being configured to generate the forced airflow from the low pressure room to the exchange room, and the exchange room being configured to exchange heat between indoor air and outside air," the heat accumulation inside the cabinet can be significantly improved to achieve good heat dissipation and cooling effects and ensure the stable operation of the integrated substation.

Further, the integrated substation of the present disclosure adopts a mixed ventilation design based on natural ventilation and forced ventilation, which can effectively reduce the heat accumulated inside the cabinet. In particular, the heat accumulated in the low pressure room, such as the heat emitted by machines, equipment, copper bars, or cables can be decreased, so as to prolong the service life and improve the operational stability of the power transformer, high-voltage device, and low-voltage device. Preferably, the cabinet can further include the at least one air intake member that is combined with the at least one air inlet leading to the low pressure room, so that outside air is more easily drawn into the low pressure room under the negative pressure created by the airflow driver.

Furthermore, the integrated substation of the present disclosure can further include the shielding structure for blocking solar radiation, thereby improving on the internal heating phenomenon of the cabinet caused by solar radiation. In addition, when the solar panel is used as the shielding structure, the solar panel can block the solar radiation to achieve better heat dissipation and cooling effect, and can also recover solar energy to generate electricity.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An integrated substation, comprising:
a cabinet having a high pressure room, a low pressure room, and an exchange room located between the high pressure room and the low pressure room, wherein the exchange room and the high pressure room are separated from each other by a first inner wall, and the exchange room and the low pressure room are separated from each other by a second inner wall;
a power transformer arranged in the exchange room;
a high-voltage device disposed in the high pressure room and electrically connected to the power transformer;
a low-voltage device disposed in the low pressure room and electrically connected to the power transformer; and
at least one airflow driver disposed on the second inner wall;
wherein the low pressure room is configured to introduce outside air, the at least one airflow driver is configured to generate a forced airflow from the low pressure room to the exchange room, and the exchange room is configured to exchange heat between indoor air and outside air.

2. The integrated substation according to claim 1, wherein the exchange room includes an oil collecting tank located under the power transformer.

3. The integrated substation according to claim 2, wherein the oil collecting tank is formed by being surroundingly defined by a plurality of oil baffles.

4. The integrated substation according to claim 1, wherein the cabinet includes a ventilation door structure, the ventilation door structure corresponds in position to the exchange room, and the ventilation door structure is configured to close or open the exchange room.

5. The integrated substation according to claim 4, wherein the ventilation door structure includes a left ventilation door, a right ventilation door, and a support member, the left ventilation door and the right ventilation door are arranged opposite to the left and right sides of the support member, and when the left ventilation door and the right ventilation door are moved to a closed position, the left ventilation door and the right ventilation door are connected in an interference fit with the support member.

6. The integrated substation according to claim 5, wherein the cabinet includes at least one air intake member, and the at least one air intake member corresponds in position to the low pressure room and is in fluid communication with the low pressure room.

7. The integrated substation according to claim 1, further comprising a shielding structure disposed on a top cover of the cabinet.

8. The integrated substation according to claim 7, wherein the shielding structure is a solar panel or a sunshade.

9. The integrated substation according to claim 1, wherein the first inner wall and the second inner wall are each an insulating wall.

10. The integrated substation according to claim 9, wherein the insulating wall includes two partitions and a thermal insulating material distributed between the two partitions.

11. The integrated substation according to claim 1, wherein a bottom frame of the cabinet includes a plurality of reinforcing ribs and a plurality of hollow portions located between the plurality of reinforcing ribs.

* * * * *